Patented May 4, 1937

2,079,481

UNITED STATES PATENT OFFICE 2,079,481

LEADED PHOSPHOR-BRONZE WELDING ROD

Irving T. Bennett, Rome, N. Y., assignor to Revere Copper and Brass Incorporated, Rome, N. Y., a corporation of Maryland No Drawing. Application October 26, 1935, Serial No. 46,932

8 Claims. (Cl. 219—8)

My invention relates to welding bodies, such as welding rods, for building up and conditioning metal parts, and particularly but not exclusively to building up and conditioning the bearing surfaces of locomotives and other machine parts.

The application is a continuation in part of my copending application Serial Number 31,622, filed July 16, 1935, which is a continuation in part of my co-pending application Serial Number 16,816, filed April 17, 1935.

Heretofore it has been proposed to recondition worn parts by depositing thereon so-called "weld metal", employing for this purpose a welding rod and any suitable process effective progressively to melt the end portion of the rod and bond the molten metal to the part, and, after the part is gradually built up and cooled, to machine it to the desired shape and size. The attempt to condition metal parts in this way has resulted in the production of a weld metal which is difficult to machine and a poor bearing surface.

Applicant has found that, by incorporating lead into the weld metal of the built up part, the same may be readily machined, and an excellent bearing surface is produced. Such a bearing metal may consist predominantly of copper containing, with relation to the total copper-tin-lead content, 2 to 20% lead and 1 to 20% tin, with the sum of the lead and tin between approximately 4 and 40%. An excellent example of such bearing metal is 10% lead, 10% tin, with the balance predominantly copper.

Applicant has further found that an improved dispersion of the lead may be secured in the bearing metal by arc-depositing, by either the carbon-arc process or the metallic-arc process, the metals of the bearing from a copper welding rod coated with lead or a lead-tin alloy. These processes in fact secure a much better dispersion of the lead than can be obtained by any casting process, and in this connection it will be understood that, largely considered, the more finely and uniformly the lead is dispersed the better will be the bearing surface. Particularly satisfactory results it has been found are secured by employing a welding rod comprising a phosphor-bronze body coated with lead, the phosphorus acting not only as a deoxidizer for the lead, and toughening and otherwise mechanically improving the deposited weld metal, but also improving the facility with which the metal may be bonded to the part being built up, and aiding in dispersing the lead.

For economic considerations the body of the welding rod is preferably both hot and cold workable. To secure this result the body should not contain more than about 5% tin or more than about 0.1% phosphorus. It is however possible to employ for the body of the rod a phosphor-bronze which is cold workable without being hot workable, under which conditions the tin should not exceed about 15% or the phosphorus about 0.5%. If the body of the rod is to be cast however the phosphorus may be as high as 12%. As low as 0.1% tin and as low as 0.005% phosphorus will secure appreciable results in any of these products.

The body of the rod is preferably coated with lead by inserting it in a tube of lead or lead-tin alloy and then drawing the tube to make it tightly fit the rod. The rod also may be coated with lead by dipping it in lead, the lead under these conditions preferably containing 1 to 5% tin with relation to the lead to cause it securely to adhere to the body of the rod. Also the rod may be coated by wrapping it with lead tape or separate tapes of lead and tin, or the lead may be electrodeposited on the body of the rod. In general the composite rod may be formed in any of the ways of making such rods known to those skilled in the art. Still another way in which lead may be mechanically associated with the rod is to incorporate the lead into the body of the rod, which may be done by adding the lead to the melt and casting the rod. Although rods made of such cast metal may be used satisfactorily, the metal is not hot workable and is difficult to work cold due to the presence of free lead, and therefore the rods are expensive to produce, and, if formed solely by a casting process, are difficult to produce when of small cross-section.

In all the above examples, when tin or lead-tin alloy is employed in the coating, the amount of tin may be such that when added to the amount of tin in the body of the rod the desired amount of tin in the bearing metal is presented. For example, if the bearing metal, neglecting phosphorus, is to contain 10% tin and 5% lead, and the phosphor-bronze body contains 5% tin with relation to the copper, and no lead, the coating may be 50:50 tin-lead solder. It will be understood, however, that preferably the phosphor-bronze body contains no lead so as to secure the maximum hot and cold workability of that body. It will also be understood that when the coating contains lead-tin alloy this alloy during the depositing operation is reduced by the copper to metallic lead, the tin dissolving in the copper or copper-base. This same reduction to metallic lead will also occur if the lead is in the form of a lead-silver, lead-antimony, or other lead-content alloy which may be present. For convenience in terminology these alloys are herein termed "reducible" lead alloys.

It has been found that if the lead in the bearing metal exceeds about 5% the same ordinarily does not readily bond to ferrous parts, such as steel. If more than this amount of lead is to be incorporated into the bearing metal preferably the ferrous part is first built up with a thin layer of non-ferrous metal containing no lead, or at least not more than about 5%, and then on this thin layer is superimposed the bearing metal containing the higher amounts of lead. The thin layer may be deposited by arc-depositing thereon a phosphor-bronze welding rod of the kind herein described or any of the copper-base welding rods commonly employed for welding steel.

During the operation of building up the metal part by use of the above described welding rods and welding processes, a small amount of lead is melted with the copper alloy fractions of the rod being deposited and is finely dispersed and uniformly mixed with the weld metal. For example, in depositing a lead coated rod by the carbon-arc process, the copper-base alloy at the end of the rod is gradually and progressively melted, the lead adjacent the end of the rod gradually melting with it and flowing into the arc, which latter finely disperses the lead and uniformly mixes it with the copper-base alloy as it is deposited. As will be understood by those skilled in the art, in carrying out these processes any suitable flux, such as borax or sodium fluoride, may be employed for forming a covering film over the molten weld metal for minimizing oxidization. If desired, the rod may be coated with these fluxes by dipping them in or brushing them with a suitable paste or paint consisting of the powdered flux and one of the above described binders such as potassium or sodium silicate.

It will be understood that as herein used the term "welding rod" is intended to include any welding metal body of convenient size and shape for performing the desired operation as, for example, it may be in the form of a wire, pencil, bar, strip, or sheet made from wrought or cast material.

I claim:

1. A welding rod comprising a phosphor-bronze body containing 0.1 to 15% tin and 0.005 to 12% phosphorus having a coating containing lead or a reducible lead alloy and presenting a rod having 1 to 20% lead.

2. A welding rod comprising a phosphor-bronze body containing 0.1 to 15% tin and not more than about 0.5% phosphorus having a coating containing lead or a reducible lead alloy and presenting a rod having 1 to 20% lead.

3. A welding rod comprising a phosphor-bronze body containing 0.1 to 5% tin and not more than about 0.1% phosphorus having a coating containing lead or a reducible lead alloy and presenting a rod having 1 to 20% lead.

4. A welding rod according to claim 1 in which the coating is metallic lead.

5. A welding rod according to claim 1 in which the coating is metallic lead containing a small amount of tin.

6. A welding rod comprising a phosphor-bronze body containing 0.005 to 12% phosphorus having a coating containing lead or a reducible lead alloy, and presenting a rod having copper, tin and lead in approximately the ratio of 80 copper, 10 tin, and 10 lead.

7. A welding rod according to claim 6 in which the phosphorus does not exceed 0.5% and the coating is metallic lead.

8. A welding rod according to claim 6 in which the phosphorus does not exceed 0.5% and the coating is metallic lead containing a small amount of tin.

IRVING T. BENNETT.